Aug. 4, 1959

C. L. TANNER 2,898,167

REINFORCED SEAL RING

Filed March 18, 1957

INVENTOR
CHARLES L. TANNER
BY
Mason & Graham
ATTORNEYS 2,898,167

REINFORCED SEAL RING

Charles L. Tanner, Los Angeles, Calif.

Application March 18, 1957, Serial No. 646,735

12 Claims. (Cl. 309—23)

This invention has to do with seal rings used to effect a seal between two parts and particularly with seal rings such as are conventionally mounted in a groove in one of the two parts between which a seal is to be effected.

Annular rings of circular cross-section, known as O rings, and rings of other cross-sectional shape, are commonly made of rubber or synthetic rubber having the desired resiliency. Such rings are unsuitable in many installations where the rings are exposed to unusual temperature or chemical conditions. It is thus necessary in such installations to use seal rings formed of other materials, particularly plastics, which are designed to withstand chemical action and unusual temperature. However, the use of plastics presents a difficulty in that the material seldom has the desired resiliency of rubber, being either too stiff, or too slowly resilient if soft, and often having a tendency to take a permanent set. Thus seal rings, particularly those of the O ring type, when made of plastics, often fail in use.

An object of the present invention is to provide a novel seal ring construction which enables the use of a variety of materials for the body of the ring and yet provides the required resiliency of the ring against compression irrespective of lack of resiliency of the material forming the body of the ring.

A further object of the invention is to provide an improved seal ring wherein the resiliency is largely supplied by means other than the material of the body of the ring which serves to maintain the body of the seal ring in pressure engagement with the surfaces against which it is desired to effect a seal.

A further object is to provide a simple seal ring construction which can be readily economically manufactured.

These and other objects will be apparent from the drawing and the following description. Referring to the drawing.

Figure 1:
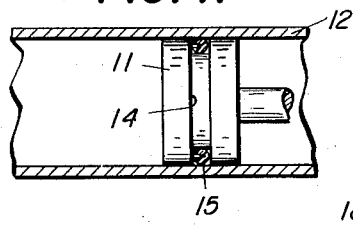
Fig. 1 is a fragmentary sectional view of a piston and cylinder showing a seal ring embodying the invention mounted on the piston.
Figure 2:
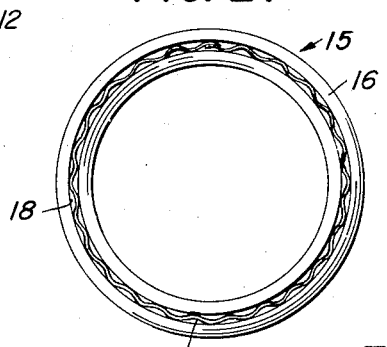
Fig. 2 is a face view of one side of a seal ring embodying the invention.
Figure 4:
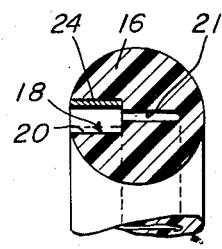
Fig. 4 is a sectional view on line 4—4 of Fig. 3.
Figure 3:
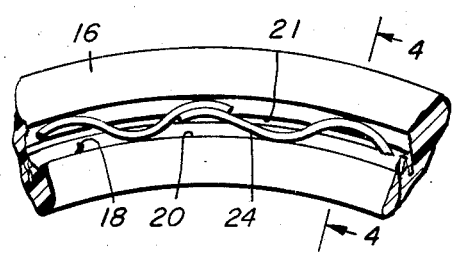
Fig. 3 is an enlarged fragmentary face view of the ring of Fig. 2.

More particularly describing the invention, in Fig. 1 I show a typical installation in which a piston 11 is shown in a cylinder 12. The piston is provided with a peripheral ring groove 14 to receive the seal ring 15.

Referring now more specifically to Figs. 2–5, as previously indicated, the seal ring body, designated 16, which is shown as circular over all and of substantially circular cross-section, may be made of a variety of materials and would normally preferably be made of plastics, "Teflon" being one such plastic which is suited for a variety of installations where the ring must be resistant to high temperatures and chemical action. It is contemplated that the body 16 be relatively stiff and possess some flexibility. It may possess resiliency but ordinarily lacks the resiliency required of a seal ring.

The body 16 is provided with a groove or annular space, designated generally by numeral 18. This is shown as comprising an outer relatively wide section 20 and an inner or narrower section 21. The latter need not be more than a slit. Preferably the groove as a whole extends somewhat over one-half the diameter of the cross-section of the body as clearly shown in Figs. 4 and 5. It is a particular feature of the invention that I provide resilient means within the groove 18 which serves to resist compression of the ring in a direction which would tend to close the groove. Various means may be used to accomplish this and in Figs. 1–8 I show a corrugated spring metal strip 24 which fits within the groove 18, being mounted in the outer portion 20 thereof.

Figure 5:
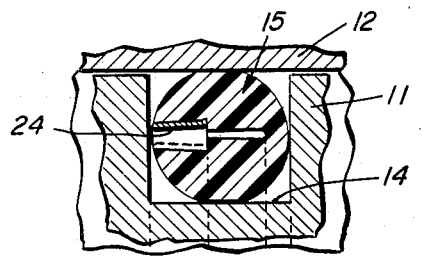
Fig. 5 is a sectional view similar to Fig. 4 but showing the seal ring installed.

Referring now to Fig. 5, it will be apparent that when the ring is installed, it will be compressed or confined between the bottom of the groove 14 in the piston 11 and the cylinder 12. This stresses the member 24, flattening the corrugations thereof so that the member 24 serves to resiliently urge the body of the ring to its original or normal position such as that shown in Fig. 4.

Figure 6:
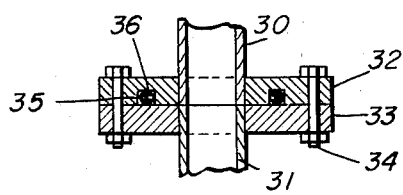
Fig. 6 is a sectional view of a flange-type joint on a pair of pipes showing another form of seal ring therein.
Figure 7:
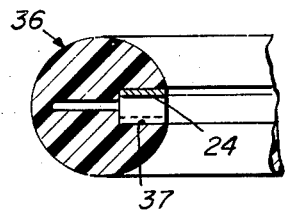
Fig. 7 is a fragmentary sectional view of the seal ring of Fig. 6 but on a larger scale.

It will be apparent that in the form of the invention shown in Figs. 1 through 5 that the groove 18 opens or faces axially of the ring as a whole, thereby rendering the ring particularly suitable for use in installations of the nature shown in Fig. 1. However, the invention can be applied to a ring which is designed for use in sealing under a condition such as shown in Fig. 6 wherein two pipes 30 and 31 having flanges 32 and 33 respectively, are shown joined by bolts 34. One of the flanges is provided with a ring groove 35 to accommodate the ring 36. The latter differs from the ring previously described in that the groove thereof, designated 37, faces or opens inwardly of the ring in a plane normal to the axis of the ring as a whole.

Figure 8:
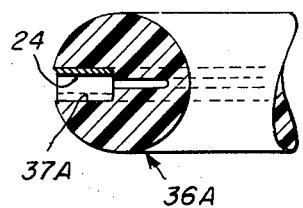
Fig. 8 is a fragmentary sectional view of still another form of seal ring.

I may also provide a ring having a peripheral groove construction such as that illustrated in Fig. 8 where the ring, designated 36A, is shown provided with a groove 37A about its periphery. The rings 36 and 36A each may be provided with a corrugated spring metal strip 24 or other resilient means for the purpose heretofore mentioned.

Figure 9:
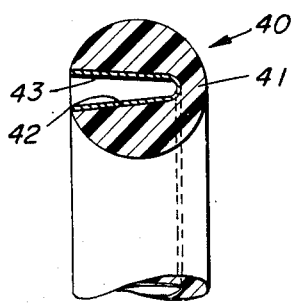
Fig. 9 is a fragmentary sectional view of an alternate form of the invention.

I contemplate that various other types of spring devices or resilient members may be used in the place of the corrugated spring metal strip 24 and by way of example, in Fig. 9 I show another form of the invention, designated generally by 40. Here the body 41 of the seal ring is provided with a relatively large groove or parting 42 in which I mount a spring metal element 43 of general U shape in cross section. It will be apparent that when the ring is installed, the member 43 will be deformed somewhat thereby to resiliently resist the compressive action on the seal ring.

Figure 10:
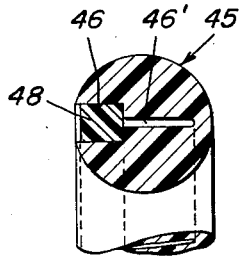
Fig. 10 is a sectional view similar to Fig. 4 but showing another form of resilient means in the body.

Still another type of resilient means is shown in Fig. 10 where I show a ring body 45 provided with a groove 46, 46′ in which I place a resilient ring 48 to reinforce the ring body against collapse and to provide resilient means for the purpose heretofore described.

The resilient reinforcing ring 48 may be rubber-like insofar as its resiliency is concerned, and, where required it may be made of a plastics having this quality but lacking the wearing quality required of the seal ring body.

While I have illustrated the body of the seal ring as made of plastics, I contemplate that other flexible materials, including metals, may be used. Also, while I have illustrated and described a preferred form of my invention, I contemplate that various changes and modifications can be made therein without departing from the invention, the scope of which is indicated by the following claims.

I claim:

1. A seal ring comprising a flexible continuous annular body of circular cross section having an annular groove opening through a surface thereof, and resilient means in said groove adapted to resist compression of said body in a manner to close said groove.

2. A seal ring comprising a flexible continuous annular body having an annular groove opening through a surface thereof, and resilient means in said groove adapted to resist compression of said body tending to close said groove, said resilient means comprising a corrugated spring metal strip.

3. A seal ring as set forth in claim 1 in which said resilient means comprises a ring of resilient material.

4. A seal ring as set forth in claim 1 in which said annular groove faces axially of the ring.

5. A seal ring comprising a flexible continuous annular body having an annular groove opening through a surface thereof in a plane normal to the axis of the ring, and resilient means in said groove adapted to resist compression of said body tending to close said groove.

6. A seal ring comprising a flexible continuous annular body of circular cross section having an annular groove opening through a surface thereof, said groove having a relatively wide outer section and a relatively narrow inner section, and resilient means in the relatively wide section of said groove adapted to resist compression of said body in a manner to close said groove.

7. A seal ring as set forth in claim 6 in which said resilient means comprises a sinuous metal spring.

8. A seal ring comprising a flexible continuous annular body having an annular groove opening through a surface thereof, said groove having a relatively wide outer section and a relatively narrow inner section, and a corrugated spring metal strip in the relatively wide section of said groove adapted to resist compression of said body tending to close said groove.

9. A seal ring as set forth in claim 6 in which said resilient means comprises a ring of resilient material.

10. A seal ring comprising a continuous, flexible, annular body of substantially round cross section having therein an annular groove opening through a surface thereof and a resilient sinuous split ring mounted in said groove; said ring having its alternate crest portions resiliently engaging opposite sides of said groove and having overlapping end portions.

11. The seal ring of claim 10 wherein said groove is of a depth greater than half the cross sectional thickness of said body.

12. A seal ring comprising a continuous, flexible, annular body having therein an annular groove of a depth greater than the cross sectional thickness of said body and opening through a surface of said body, and an annular resilient ring mounted in said groove and having opposed portions bearing against opposite sides of said groove.

References Cited in the file of this patent

UNITED STATES PATENTS

| | | |
|---|---|---|
| 1,854,708 | Mastin et al. | Apr. 19, 1932 |
| 2,145,928 | Heinze et al. | Feb. 7, 1939 |
| 2,521,248 | Parker | Sept. 5, 1950 |
| 2,631,906 | Brock | Mar. 17, 1953 |
| 2,733,969 | Polk | Feb. 7, 1956 |

UNITED STATES PATENT OFFICE
CERTIFICATE OF CORRECTION

Patent No. 2,898,167                                August 4, 1959

Charles L. Tanner

It is hereby certified that error appears in the above numbered patent requiring correction and that the said Letters Patent should read as corrected below.

Column 4, line 26, after "than" insert -- half --.

Signed and sealed this 21st day of November 1961.

(SEAL)
Attest:

ERNEST W. SWIDER                                DAVID L. LADD
Attesting Officer                                    Commissioner of Patents
                                                                           USCOMM-DC